US012776458B2

(12) United States Patent
Lu et al.

(10) Patent No.: US 12,776,458 B2
(45) Date of Patent: Oct. 27, 2026

(54) MEMBRANE KEYBOARD AND MANUFACTURING METHOD THEREOF

(71) Applicant: CHICONY ELECTRONICS CO., LTD., New Taipei City (TW)

(72) Inventors: Chih-Yi Lu, New Taipei City (TW); Chih-Hung Lin, New Taipei City (TW)

(73) Assignee: CHICONY ELECTRONICS CO., LTD., New Taipei City (TW)

( * ) Notice: Subject to any disclaimer, the term of this patent is extended or adjusted under 35 U.S.C. 154(b) by 271 days.

(21) Appl. No.: 18/799,467

(22) Filed: Aug. 9, 2024

(65) Prior Publication Data

US 2025/0104939 A1 Mar. 27, 2025

(30) Foreign Application Priority Data

Sep. 21, 2023 (TW) ................................ 112136116

(51) Int. Cl.
*H01H 13/703* (2006.01)
*H01H 11/00* (2006.01)

(52) U.S. Cl.
CPC .......... *H01H 13/703* (2013.01); *H01H 11/00* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 3/60
See application file for complete search history.

(56) References Cited

U.S. PATENT DOCUMENTS

| | | | | |
|---|---|---|---|---|
| 10,629,395 B1 * | 4/2020 | Fu | H01H 13/86 | |
| 2009/0103964 A1 * | 4/2009 | Takagi | H01H 3/125 | 400/495 |
| 2011/0155551 A1 * | 6/2011 | Yamada | H01H 13/705 | 200/5 A |
| 2014/0014488 A1 * | 1/2014 | Tsai | H01H 13/88 | 200/5 A |
| 2018/0005779 A1 * | 1/2018 | Chen | H01H 13/703 | |
| 2020/0273642 A1 * | 8/2020 | Yen | G06F 1/1664 | |

FOREIGN PATENT DOCUMENTS

TW M403698 U 5/2011

* cited by examiner

*Primary Examiner* — Ahmed M Saeed

(74) *Attorney, Agent, or Firm* — Muncy, Geissler, Olds & Lowe, P.C.

(57) ABSTRACT

A membrane keyboard and manufacturing method thereof, the manufacturing method comprises the following steps: forming a first positioning hole on an upper circuited layer, forming a second positioning hole and a plurality of hollow portions on a spacer layer, forming a third positioning hole on a lower circuited layer, wherein a minimum diameter of the second positioning hole is smaller than a minimum diameter of the first positioning hole and a minimum diameter of the third positioning hole; adhering the upper circuited layer, the spacer layer and the lower circuited layer, to form a restoring member positioning hole; placing the membrane circuit board in the restoring member assembly fixture and passing the restoring member positioning hole through a locating pillar of the restoring member assembly fixture, with an inner wall of the second positioning hole abutting the locating pillar.

17 Claims, 8 Drawing Sheets

MEMBRANE KEYBOARD AND MANUFACTURING METHOD THEREOF

CROSS-REFERENCE TO RELATED APPLICATION

This application claims the priority benefit of Taiwan application serial No. 112136116, filed on Sep. 21, 2023. The entirety of the above-mentioned patent application is hereby incorporated by reference herein and made a part of this specification.

BACKGROUND

1. Technical Field

The present disclosure relates to a membrane keyboard and a manufacturing method thereof, particularly to a method for assembling restoring members onto a membrane circuit board of a membrane keyboard.

2. Description of the Related Art

In current computer usage, keyboards are essential input devices. Both computers and their peripheral products are developing towards lightweight, thin, short, and small designs. Slim keyboards usually use membrane circuit boards, also known as membrane keyboards. Refer to FIG. 1A and FIG. 1B. FIG. 1A is a partial perspective view of a prior art membrane keyboard; and FIG. 1B is a simplified top view of the membrane circuit board and restoring member as shown in FIG. 1A. The main components of a membrane keyboard 9 comprise a membrane circuit board 91, keycaps 92, and restoring members 93. The restoring members 93, such as rubber dome structures, are placed between the membrane circuit board 91 and the keycaps 92.

The membrane circuit board 91 consists of an upper circuited layer 911, a spacer layer 912, and a lower circuited layer 913. The corresponding surfaces of the upper circuited layer 911 and the lower circuited layer 913 respectively have conductive circuits C (e.g., circuits configured with silver paste). The spacer layer 912 has hollow portions 912*a* corresponding to the positions of the conductive circuits C. When the keycap 92 is pressed, the restoring member 93 presses down the upper circuited layer 911, allowing the conductive circuits C in the hollow portions 912*a* to contact and conduct, generating corresponding input signals. Therefore, the positioning between the restoring member 93 and the hollow portion 912*a* is crucial.

Currently, the manufacturing method of the membrane circuit board 91 involves adhering the upper circuited layer 911, the spacer layer 912 (with hollow portions 912*a*), and the lower circuited layer 913, then punching positioning hole 94. The positioning hole 94 is used for positioning the membrane circuit board 91 and the restoring members 93, as well as for positioning the subsequent assembly of scissor-type connecting member. Specifically, the membrane circuit board 91 is placed in a fixture used for assembling the membrane circuit board 91 and the restoring members 93. The fixture comprises a locating pillar, and the positioning hole 94 passes through the locating pillar to fix the relative position of the membrane circuit board 91 and the restoring members 93. If there are no assembly tolerances, the central positions (e.g., center points) of the restoring members 93, the conductive circuits C, and the hollow portions 912*a* will be aligned on the same straight line.

However, if assembly tolerances occur during the adhesion of the upper circuited layer 911, the spacer layer 912, and the lower circuited layer 913, the central positions of the conductive circuits C and the hollow portions 912*a* may be misaligned. Subsequently, when the restoring members 93 are attached, their central positions may correspond to the central positions of the conductive circuits C but be misaligned with the central positions of the hollow portions 912*a*, as shown in FIG. 1A and FIG. 1B. In such cases, the central position of the restoring member 93 may correspond to the edge of the hollow portion 912*a*. When the keycap 92 is pressed, the edge of the hollow portion 912*a* will obstruct the deformation of the upper circuited layer 911, affecting the smoothness of the user's pressing. In other words, the user must press the keycap 92 harder to effectively trigger and generate input signals. Therefore, there is still room for improvement in the manufacturing and assembly methods of the membrane circuit board and restoring members of prior art membrane keyboards.

SUMMARY

In view of the issue above, it is a primary object of the present disclosure to provide a membrane keyboard and a manufacturing method thereof, solving the problems caused by assembly tolerances in the membrane circuit board of prior art membrane keyboard by the novel design of a restoring member positioning hole in a membrane circuit board.

To achieve the above objective, the present disclosure provides a manufacturing method of membrane keyboard, applied to assemble a plurality of restoring members in a restoring member assembly fixture to a membrane circuit board. The manufacturing method comprises the following steps: forming at least one first positioning hole on an upper circuited layer, forming at least one second positioning hole and a plurality of hollow portions on a spacer layer, forming at least one third positioning hole on a lower circuited layer, wherein a minimum diameter of the second positioning hole is smaller than a minimum diameter of the first positioning hole, and the minimum diameter of the second positioning hole is smaller than a minimum diameter of the third positioning hole; adhering the upper circuited layer, the spacer layer, and the lower circuited layer to form a semi-finished membrane circuit board, and the first positioning hole, the second positioning hole, and the third positioning hole collectively form a restoring member positioning hole; placing the membrane circuit board in the restoring member assembly fixture and passing the restoring member positioning hole through a locating pillar of the restoring member assembly fixture, with an inner wall of the second positioning hole abutting the locating pillar, so that the central positions of the restoring members respectively correspond to the central positions of the hollow portions; and assembling the restoring members onto the membrane circuit board.

According to an embodiment of the present disclosure, after forming the restoring member positioning hole, the manufacturing method further comprises the step of punching a plurality of structural holes on the semi-finished membrane circuit board to form the membrane circuit board.

According to an embodiment of the present disclosure, when the semi-finished membrane circuit board is punched to form the structural holes, at least one assembly positioning hole is simultaneously formed, and the assembly positioning hole is used for positioning the assembly of a plurality of key structures so that the structural holes respectively correspond to the key structures.

According to an embodiment of the present disclosure, the upper circuited layer, the spacer layer, and the lower circuited layer each comprise a circuit board positioning hole, and the circuit board positioning hole is used for positioning the adhesion of the upper circuited layer, the spacer layer, and the lower circuited layer.

According to an embodiment of the present disclosure, the manufacturing method of the membrane keyboard further comprises the step of cutting the semi-finished membrane circuit board to remove the circuit board positioning hole.

To achieve the above objective, the present disclosure also provides a membrane keyboard, comprising a membrane circuit board and a plurality of restoring members. The membrane circuit board comprises an upper circuited layer, a spacer layer, and a lower circuited layer. The upper circuited layer has at least one first positioning hole. The spacer layer has at least one second positioning hole and a plurality of hollow portions, wherein a minimum diameter of the second positioning hole is smaller than a minimum diameter of the first positioning hole. The lower circuited layer has at least one third positioning hole, wherein the minimum diameter of the second positioning hole is smaller than a minimum diameter of the third positioning hole, and the first positioning hole, the second positioning hole, and the third positioning hole collectively form a restoring member positioning hole. The restoring members are disposed on the membrane circuit board, with the central positions of the restoring members respectively corresponding to the central positions of the hollow portions.

According to an embodiment of the present disclosure, the restoring members are housed in a restoring member assembly fixture before assembly, and the restoring member positioning hole of the membrane circuit board passes through a locating pillar of the restoring member assembly fixture, with an inner wall of the second positioning hole abutting the locating pillar, so that the central positions of the restoring members respectively correspond to the central positions of the hollow portions.

According to an embodiment of the present disclosure, the membrane keyboard further comprises a plurality of key structures disposed on the membrane circuit board. The restoring members respectively contact the key structures.

According to an embodiment of the present disclosure, the membrane circuit board comprises a plurality of structural holes and at least one assembly positioning hole, with the structural holes respectively corresponding to the key structures, and the assembly positioning hole used for positioning the assembly of the key structures.

According to an embodiment of the present disclosure, the minimum diameter of the first positioning hole is greater than the sum of the minimum diameter of the second positioning hole and an assembly tolerance, and the minimum diameter of the third positioning hole is greater than the sum of the minimum diameter of the second positioning hole and the assembly tolerance.

According to an embodiment of the present disclosure, the assembly tolerance ranges from 0.15 mm to 3 mm.

According to an embodiment of the present disclosure, an inner diameter of the second positioning hole is greater than or equal to an outer diameter of the locating pillar.

According to an embodiment of the present disclosure, the upper circuited layer comprises a plurality of the first positioning holes, the spacer layer comprises a plurality of the second positioning holes, and the lower circuited layer comprises a plurality of the third positioning holes to form a plurality of the restoring member positioning holes.

In continuation of the above, according to the membrane keyboard and its manufacturing method of the present disclosure, first positioning holes, second positioning holes, and third positioning holes are respectively formed on the upper circuited layer, spacer layer, and lower circuited layer of the membrane circuit board. The first positioning hole, the second positioning hole, and the third positioning hole collectively form a restoring member positioning hole. The minimum diameter of the second positioning hole is smaller than the minimum diameter of the first positioning hole, and the minimum diameter of the second positioning hole is smaller than the minimum diameter of the third positioning hole. With this special structure of the restoring member positioning hole, the central positions of the restoring members can respectively correspond to the central positions of the hollow portions regardless of any assembly tolerances, thereby preventing any adverse effects on the user's keystroke feel and smoothness.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1A:
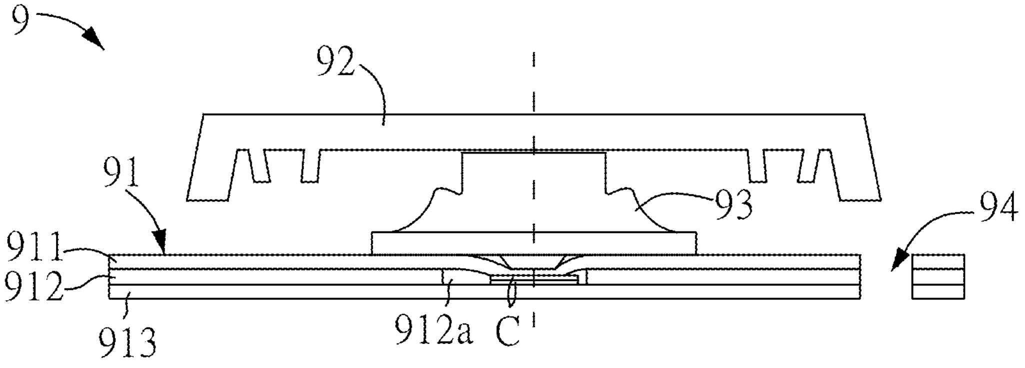
FIG. 1A (Prior Art)
FIG. 1A is a partial schematic view of a prior art membrane keyboard.
Figure 1B:
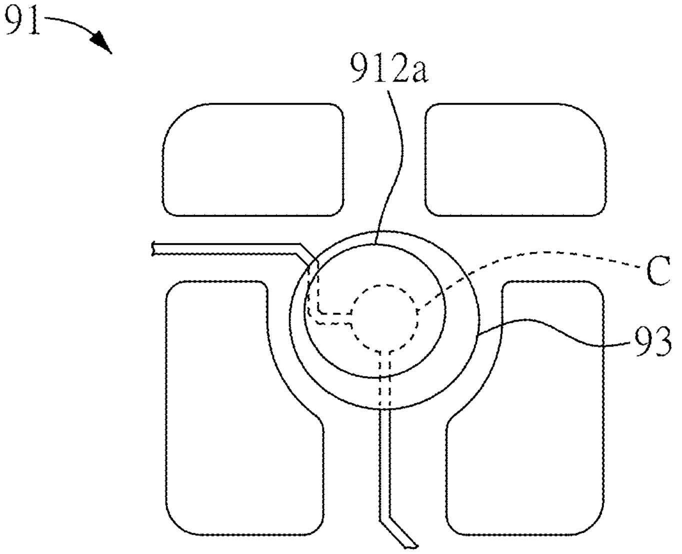
FIG. 1B (Prior Art)
FIG. 1B is a simplified top view of the membrane circuit board and restoring member shown in FIG. 1A.
Figure 2:
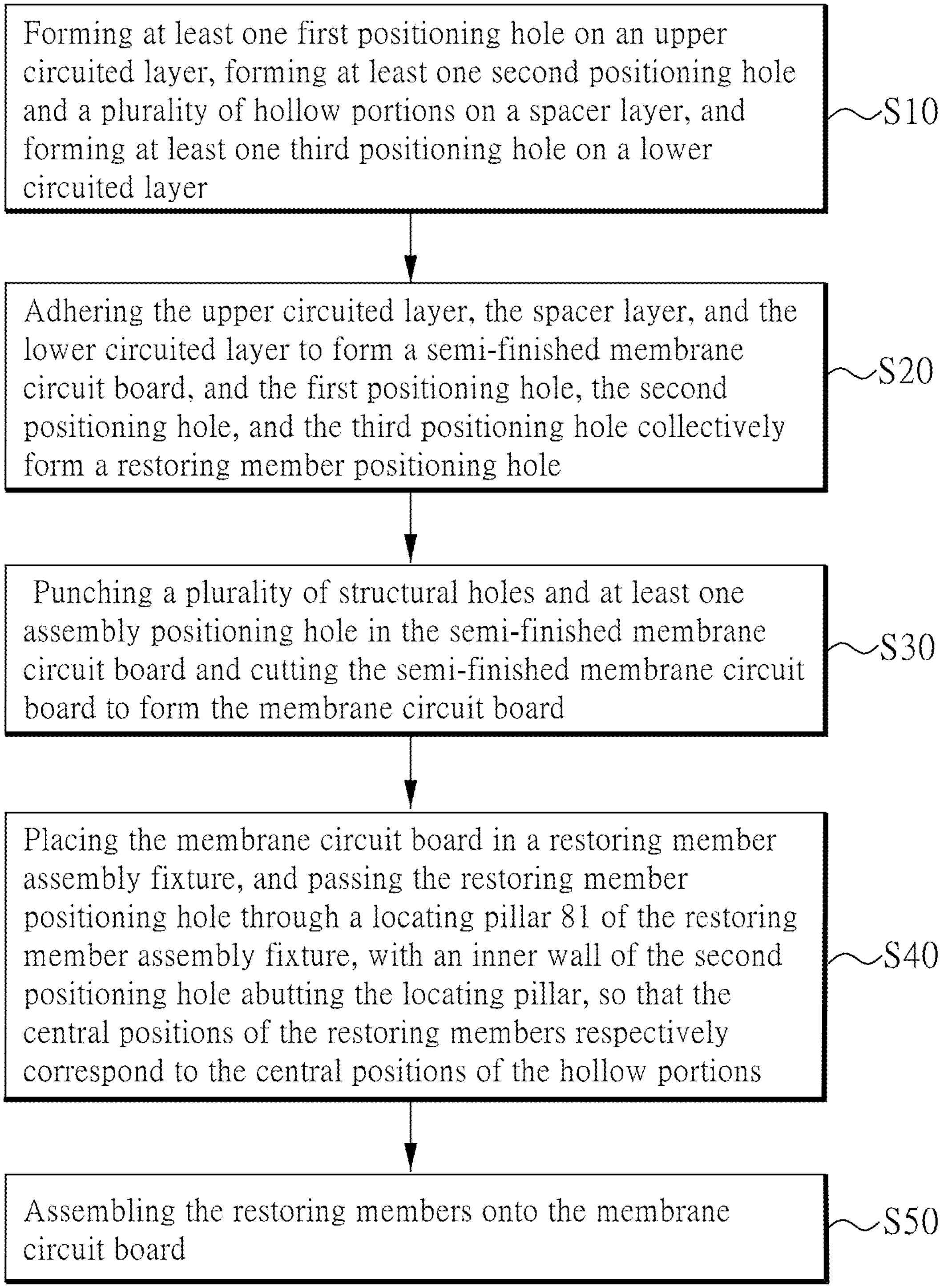
FIG. 2 is a flowchart of a manufacturing method of membrane keyboard according to an embodiment of the present disclosure.
Figure 3:
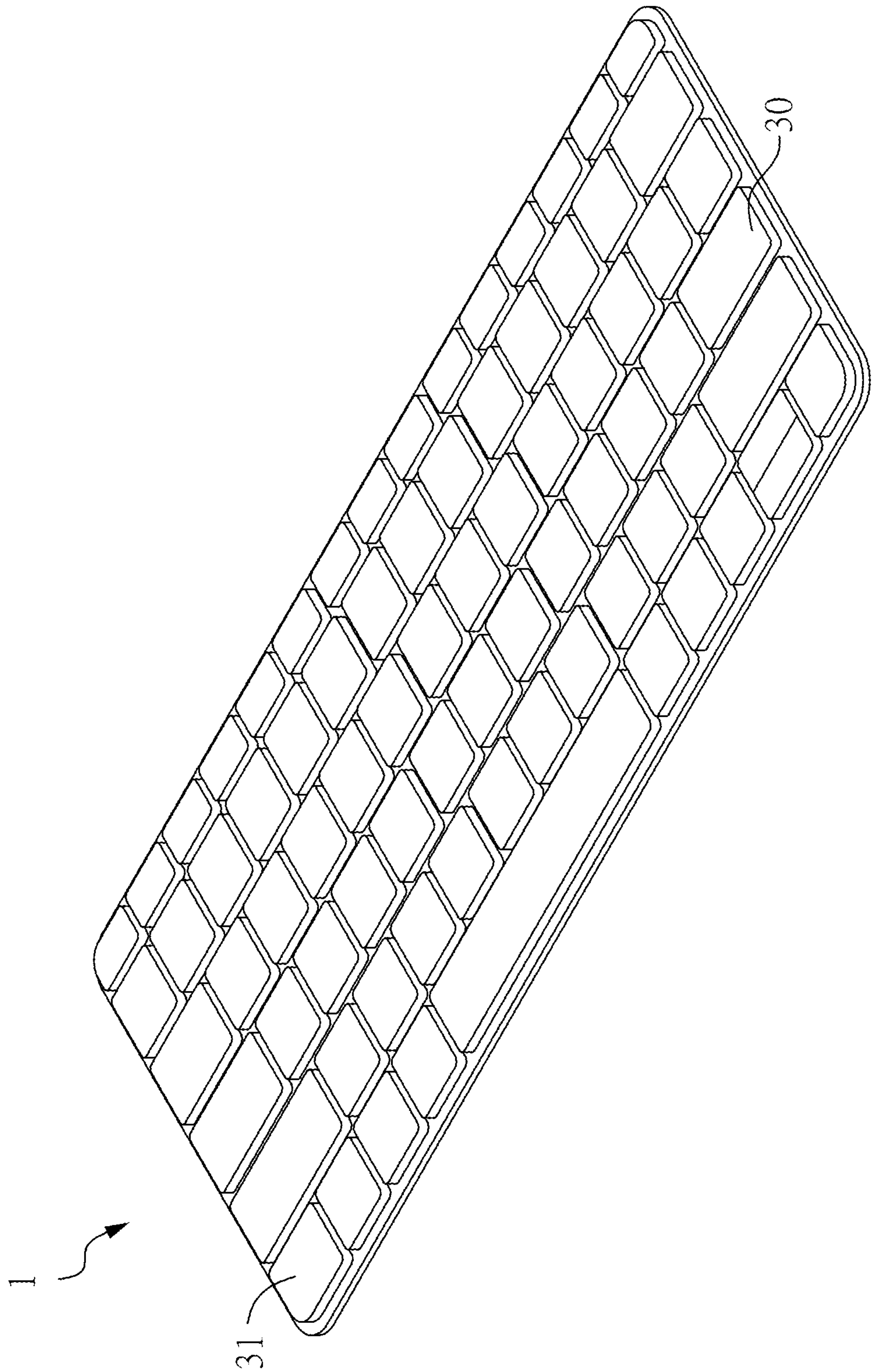
FIG. 3 is a schematic view of a membrane keyboard according to an embodiment of the present disclosure.
Figure 4:
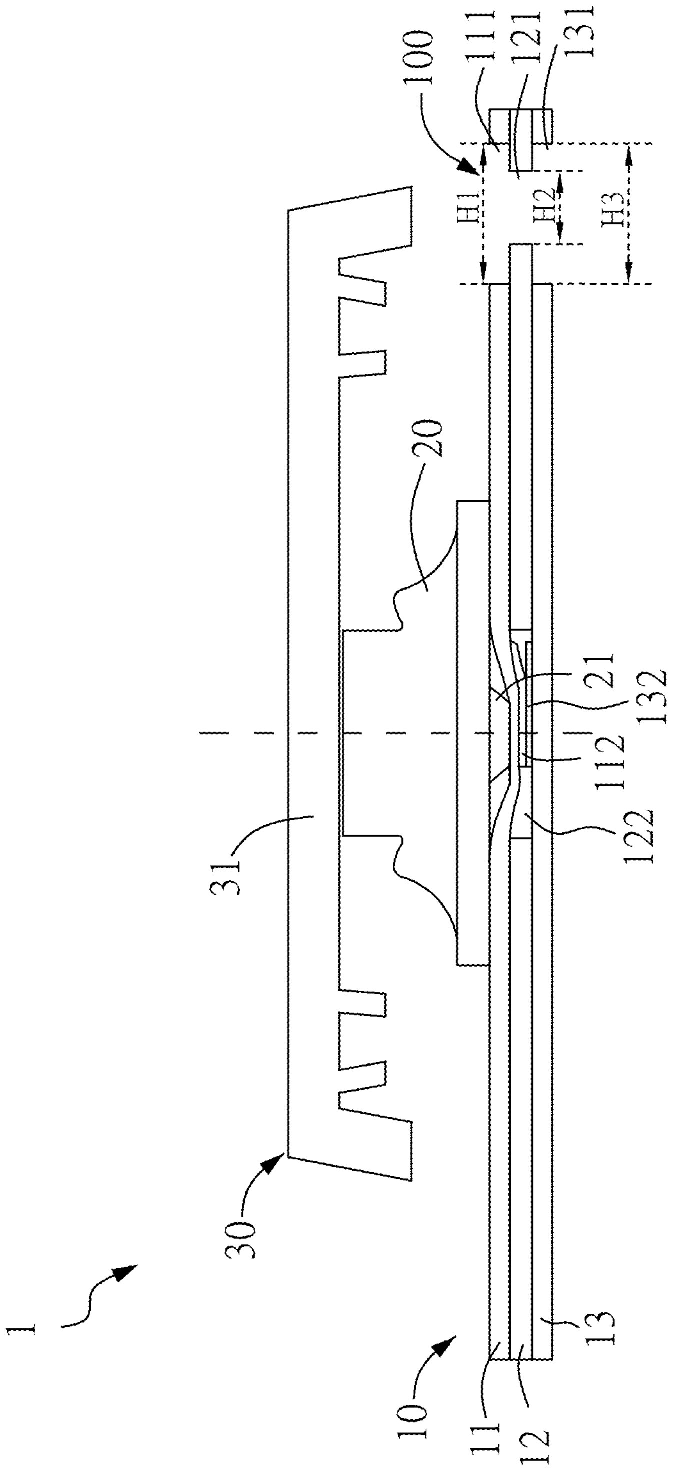
FIG. 4 is a partial cross-sectional schematic view of the membrane keyboard shown in FIG. 3.
Figure 5:
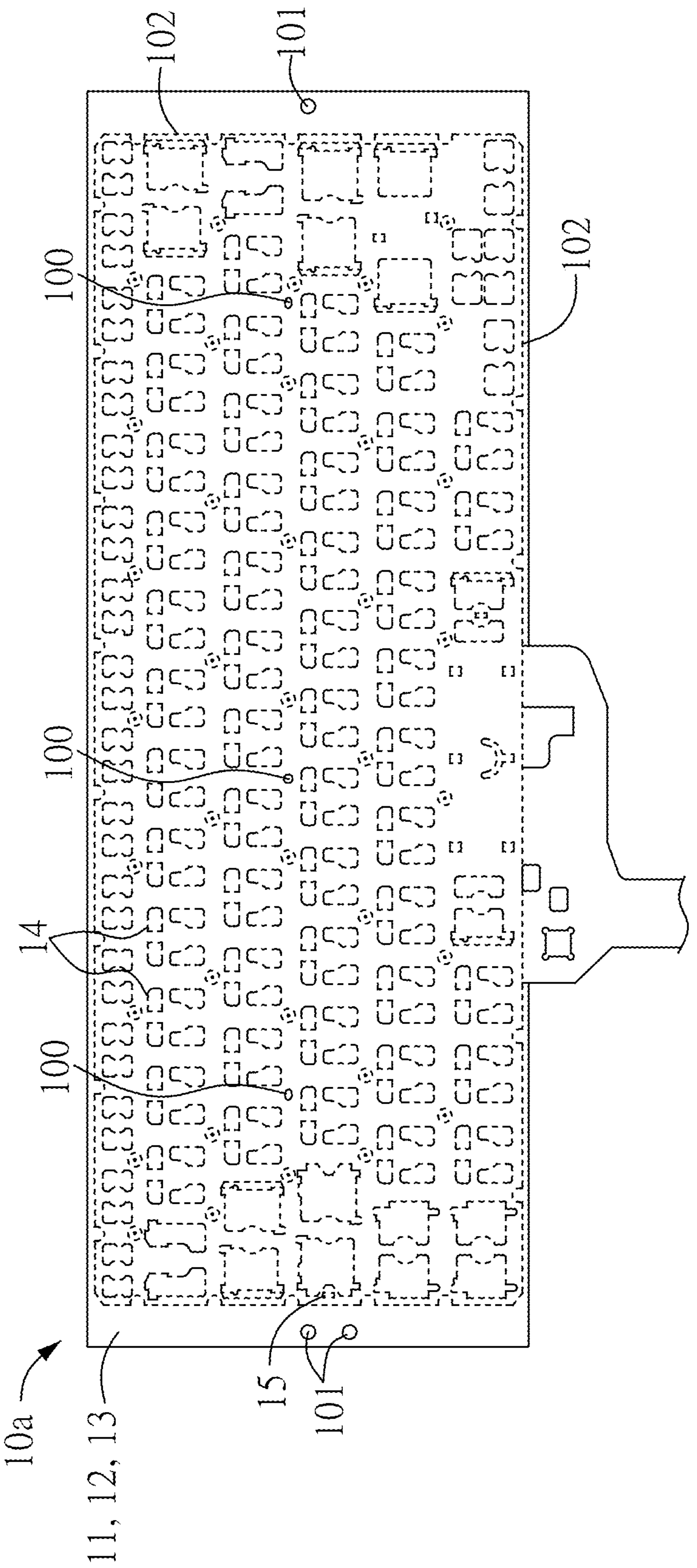
FIG. 5 is a schematic view of a semi-finished membrane circuit board formed according to step S20 shown in FIG. 2.
Figure 6:
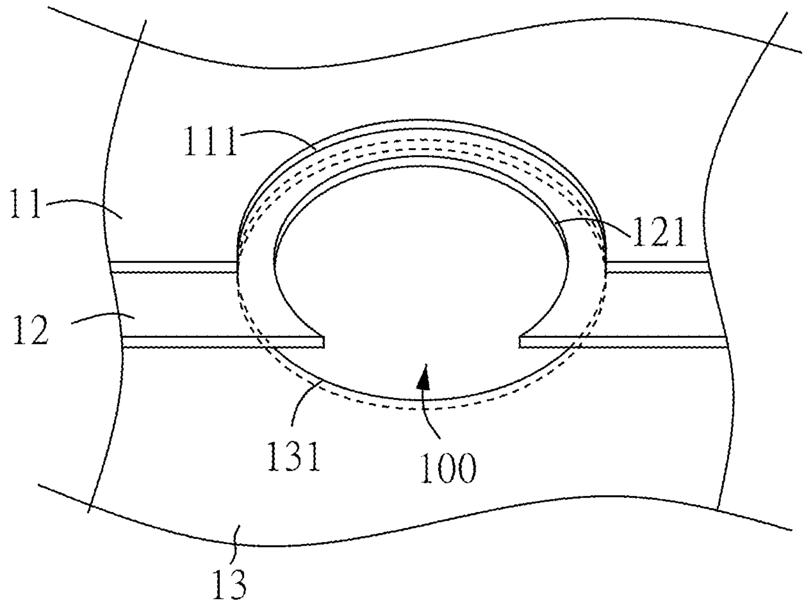
FIG. 6 is an enlarged schematic view of one of the restoring member positioning holes shown in FIG. 5.
Figure 7:
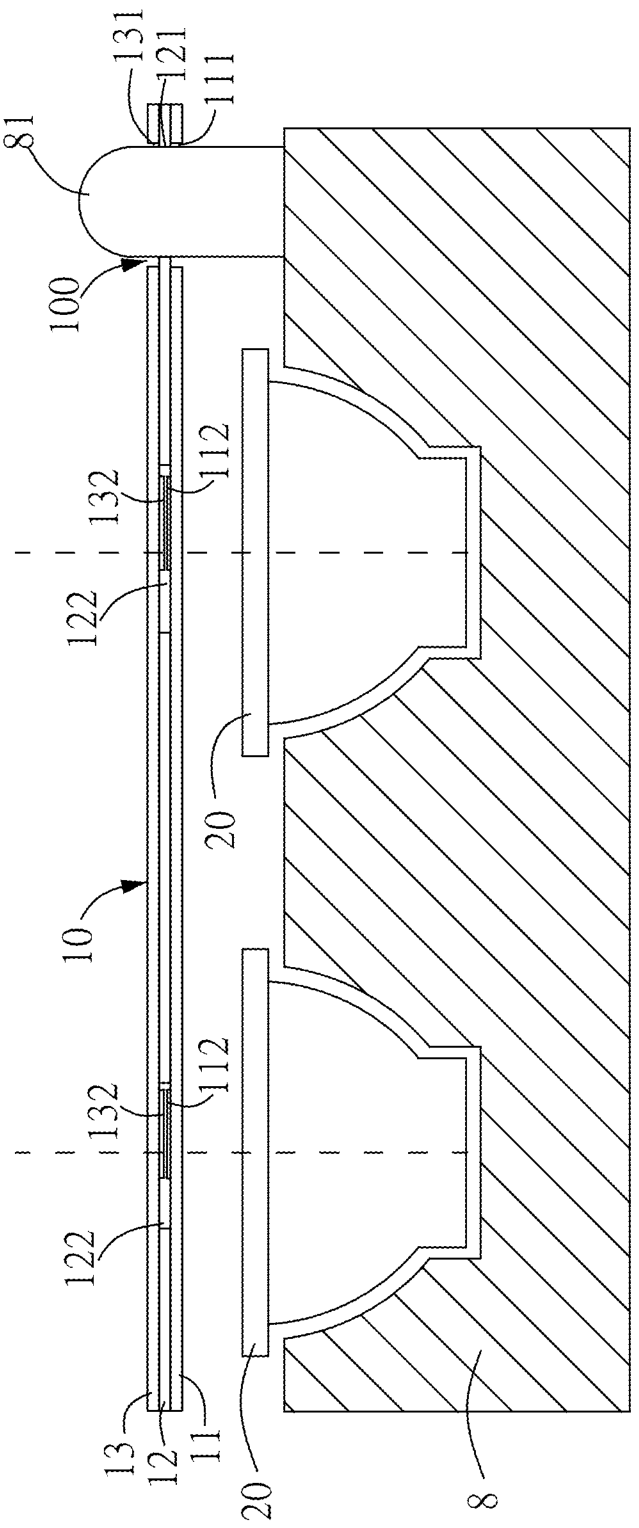
FIG. 7 is a schematic view of step S40 shown in FIG. 2.
Figure 8:
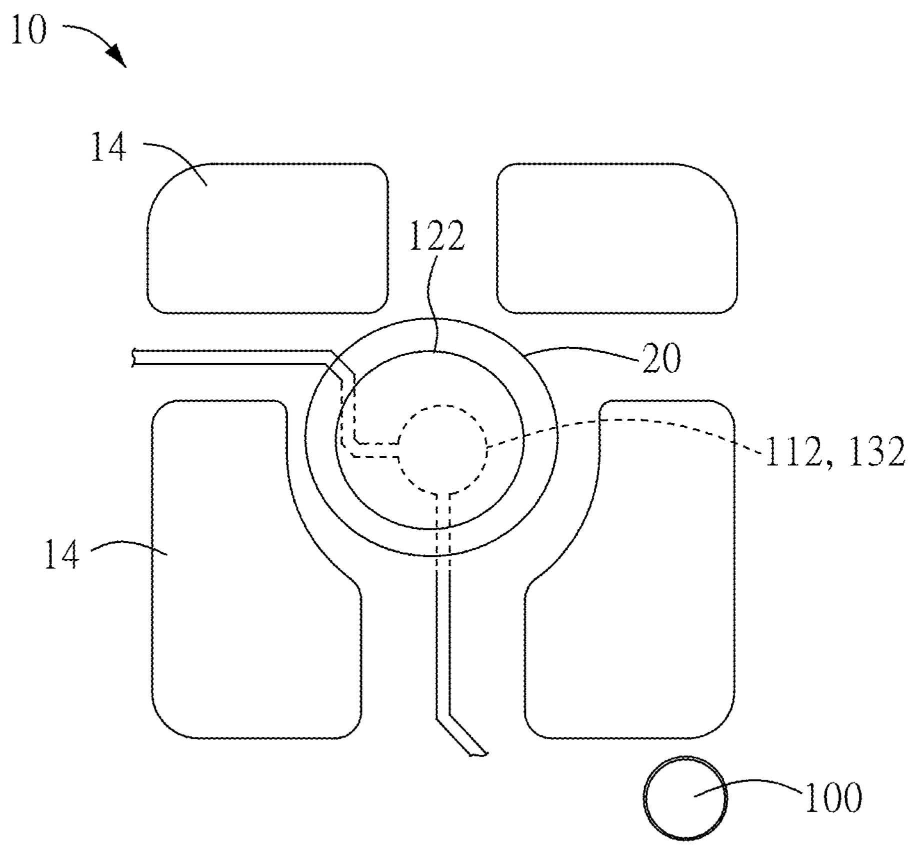
FIG. 8 is a simplified top view of the membrane circuit board and restoring member shown in FIG. 4.

FIG. 2 is a flowchart of a manufacturing method of membrane keyboard according to an embodiment of the present disclosure; FIG. 3 is a schematic view of a membrane keyboard according to an embodiment of the present disclosure; FIG. 4 is a partial cross-sectional schematic view of the membrane keyboard shown in FIG. 3; FIG. 5 is a schematic view of a semi-finished membrane circuit board formed according to step S20 shown in FIG. 2; FIG. 6 is an enlarged schematic view of one of the restoring member positioning holes shown in FIG. 5; FIG. 7 is a schematic view of step S40 shown in FIG. 2; and FIG. 8 is a simplified top view of the membrane circuit board and restoring member shown in FIG. 4. The following description should be read in conjunction with the above drawings.

Refer to FIG. 3 and FIG. 4. In this embodiment, the membrane keyboard 1 comprises a membrane circuit board

10, a plurality of restoring members 20, and a plurality of key structures 30. It should be noted that FIG. 4 shows a schematic view of the membrane circuit board 10 and the restoring member 20 corresponding to one of the key structures 30. Generally, the membrane keyboard 1 also has a base plate (not shown in the figure), the membrane circuit board 10 is disposed above the base plate, and the key structures 30 are disposed above the membrane circuit board 10. Further, the base plate has a plurality of hooks. The key structure 30 comprises a keycap 31 and a scissor-type connecting member (not shown in the figure). The scissor-type connecting member connects the keycap 31 to the base plate, guiding the keycap 31 to move up and down relative to the base plate. The restoring member 20 is placed between the membrane circuit board 10 and the key structure 30, and the restoring member 20 contacts the keycap 31 of the key structure 30. When the keycap 31 is pressed, the restoring member 20 can trigger the switch of the membrane circuit board 10. The restoring member 20 then guides the keycap 31 back to its original position. The following describes the method for manufacturing the membrane circuit board 10 and assembling it with the restoring members 20 according to this embodiment in conjunction with FIG. 2. Preferably, the restoring member 20 can be a rubber dome. However, the present disclosure does not limit the sequence of the steps in the following embodiments.

Step S10: Forming at least one first positioning hole 111 on an upper circuited layer 11, forming at least one second positioning hole 121 and a plurality of hollow portions 122 on a spacer layer 12, and forming at least one third positioning hole 131 on a lower circuited layer 13.

Specifically, in step S10, an upper circuited layer 11, a spacer layer 12, and a lower circuited layer 13 for forming the membrane circuit board 10 are provided. The upper circuited layer 11 comprises an upper conductive circuit 112, and the lower circuited layer 13 comprises a lower conductive circuit 132. The upper conductive circuit 112 and the lower conductive circuit 132 can be circuits configured with silver paste, for example. The upper circuited layer 11, the spacer layer 12, and the lower circuited layer 13 can all be plastic films, such as but not limited to polyethylene terephthalate (PET or PETE). In this embodiment, the first positioning hole 111 is formed on the upper circuited layer 11 using a punching process, the second positioning hole 121 and the hollow portions 122 are simultaneously formed on the spacer layer 12, and the third positioning hole 131 is formed on the lower circuited layer 13. In other words, the upper circuited layer 11 has the first positioning hole 111, the spacer layer 12 has the second positioning hole 121 and the hollow portions 122, and the lower circuited layer 13 has the third positioning hole 131.

In this embodiment, a minimum diameter H2 of the second positioning hole 121 is smaller than a minimum diameter H1 of the first positioning hole 111, and the minimum diameter H2 of the second positioning hole 121 is also smaller than a minimum diameter H3 of the third positioning hole 131, as shown in FIG. 4 and FIG. 6. The minimum diameters H1, H2, and H3 are marked in FIG. 4. It should be noted that the first positioning hole 111, the second positioning hole 121, and the third positioning hole 131 in this embodiment can be circular, oval, or other shaped holes. Therefore, the minimum diameters H1, H2, and H3 of the first positioning hole 111, the second positioning hole 121, and the third positioning hole 131 mentioned here refer to the minimum distances of the first positioning hole 111, the second positioning hole 121, and the third positioning hole 131. For example, the minimum diameter of a circular hole is its diameter, and the minimum diameter of an oval hole is its minor axis distance. For other shaped holes, the minimum diameter is the shortest distance between opposite sides.

Step S20: Adhering the upper circuited layer 11, the spacer layer 12, and the lower circuited layer 13 to form a semi-finished membrane circuit board **10*a*, and the first positioning hole 111, the second positioning hole 121, and the third positioning hole 131 collectively form a restoring member positioning hole 100**.

After coating the three plastic films of the upper circuited layer 11, the spacer layer 12, and the lower circuited layer 13 with adhesive and stacking them, the upper circuited layer 11, the spacer layer 12, and the lower circuited layer 13 can be adhered to form the semi-finished membrane circuit board **10*a*, as shown in FIG. 5. At this time, the first positioning hole 111, the second positioning hole 121, and the third positioning hole 131 collectively form a restoring member positioning hole 100, as shown in FIG. 4 and FIG. 6. It should be noted that to clearly show the first positioning hole 111, the second positioning hole 121, and the third positioning hole 131, partial structures of the upper circuited layer 11 and the spacer layer 12 are shown in FIG. 6. Because the minimum diameter H2 of the second positioning hole 121 is smaller than the minimum diameter H1 of the first positioning hole 111 and the minimum diameter H3 of the third positioning hole 131, a structure is formed in which a part of the spacer layer 12 protrudes from the restoring member positioning hole 100 (i.e., the position of the second positioning hole 121**).

As described above, the first positioning hole 111, the second positioning hole 121, and the third positioning hole 131 can be circular, oval, or other shaped holes. Correspondingly, the restoring member positioning hole 100 formed after adhesion can also be circular, oval, or other shaped holes. Generally, the method of using locating pillars (or locating pins) is often used for positioning objects. This method requires at least two locating pillars to achieve positioning. The first hole used for positioning on the object (e.g., the semi-finished membrane circuit board **10*a*) is usually a circular hole (e.g., the restoring member positioning hole 100 located in the center shown in FIG. 6), while other holes for positioning consider the deformation amount of the object and use oval holes (e.g., the restoring member positioning holes 100 near the left and right sides shown in FIG. 6**) or elongated slots. For example, depending on whether the object normally deforms laterally or vertically, a horizontal oval hole or a vertical oval hole is chosen.

Preferably, the upper circuited layer 11, the spacer layer 12, and the lower circuited layer 13 of this embodiment each comprise a circuit board positioning hole 101, as shown in FIG. 5. The circuit board positioning hole 101 is used for positioning the adhesion of the upper circuited layer 11, the spacer layer 12, and the lower circuited layer 13. It should be noted that after the upper circuited layer 11, the spacer layer 12, and the lower circuited layer 13 are stacked (as shown in FIG. 5), the circuit board positioning holes 101 of the upper circuited layer 11, the spacer layer 12, and the lower circuited layer 13 collectively form a through hole; thus, the same reference numeral is used, and a single circuit board positioning hole 101 is collectively marked in FIG. 5. Specifically, during the adhesion of the upper circuited layer 11, the spacer layer 12, and the lower circuited layer 13, corresponding fixtures can also be used. The circuit board positioning holes 101 of the upper circuited layer 11, the spacer layer 12, and the lower circuited layer 13 respectively pass through the locating pillars of the fixture, so that the upper circuited layer 11, the spacer layer 12, and the lower circuited layer 13 are aligned with each other.

Additionally, when the upper circuited layer 11, the spacer layer 12, and the lower circuited layer 13 are stacked, the upper conductive circuit 112 of the upper circuited layer 11 corresponds to the hollow portions 122 of the spacer layer 12, and the lower conductive circuit 132 of the lower circuited layer 13 also corresponds to the hollow portions 122. This means that part of the upper conductive circuit 112 and the lower conductive circuit 132 is accommodated within the hollow portions 122. When the keycap 31 is pressed, the restoring member 20 presses down the upper circuited layer 11, causing the upper conductive circuit 112 and the lower conductive circuit 132 within the hollow portions 122 to contact each other and generate a triggering signal.

If there are no assembly tolerances, the central positions (e.g., center points) of the upper conductive circuit 112, the lower conductive circuit 132, and the hollow portions 122 can be aligned on the same straight line or in close positions. If there are assembly tolerances, the central positions of the upper conductive circuit 112 or the lower conductive circuit 132 and the hollow portions 122 may be misaligned, as shown in FIG. 4 and FIG. 8. Because the membrane keyboard 1 and its manufacturing method in the this disclosure are intended to solve the problem of potentially failing to smoothly trigger the upper conductive circuit 112 and the lower conductive circuit 132 due to assembly tolerances, FIG. 4 and FIG. 8 both illustrate the situation with assembly tolerances as an example.

Preferably, the minimum diameter H1 of the first positioning hole 111 is greater than the sum of the minimum diameter H2 of the second positioning hole 121 and an assembly tolerance. Similarly, the minimum diameter H3 of the third positioning hole 131 is greater than the sum of the minimum diameter H2 of the second positioning hole 121 and the assembly tolerance. Specifically, the assembly tolerance may comprise the tolerance for forming the first positioning hole 111, the second positioning hole 121, and the third positioning hole 131 by punching, as well as the misalignment tolerance when adhering the upper circuited layer 11, the spacer layer 12, and the lower circuited layer 13. Preferably, the assembly tolerance ranges from 0.15 mm to 3 mm. For example, if the minimum diameter H2 of the second positioning hole 121 of this embodiment is 3.5 mm, then the minimum diameter H1 and the minimum diameter H3 may be greater than 3.65 mm or greater than 6.5 mm. Because the minimum diameter H1 of the first positioning hole 111 and the minimum diameter H3 of the third positioning hole 131 are both greater than the sum of the minimum diameter H2 of the second positioning hole 121 and the assembly tolerance, even if there are assembly tolerances during the adhesion of the upper circuited layer 11, the spacer layer 12, and the lower circuited layer 13, the second positioning hole 121 will not be obstructed by the upper circuited layer 11 or the lower circuited layer 13. This ensures that part of the spacer layer 12 protrudes from the restoring member positioning hole 100 (i.e., the position of the second positioning hole 121), as shown in FIG. 6.

Step S30: Punching a plurality of structural holes 14 and at least one assembly positioning hole 15 in the semi-finished membrane circuit board 10*a* and cutting the semi-finished membrane circuit board 10*a* to form the membrane circuit board 10.

Next, the semi-finished membrane circuit board 10*a* is punched to form the structural holes 14 and the assembly positioning hole 15 simultaneously. The positions and shapes of the structural holes 14 and the assembly positioning hole 15 can refer to FIG. 5. It should be noted that the structural holes 14 and the assembly positioning hole 15 are represented by dashed lines in FIG. 5 as they are the structure after punching and cutting. Preferably, when the structural holes 14 are punched in the semi-finished membrane circuit board 10*a*, the assembly positioning hole 15 is also formed simultaneously. The assembly positioning hole 15 in this embodiment is used for positioning the subsequent assembly of the key structures 30, so that the structural holes 14 can correspond to the key structures 30. Specifically, the structural holes 14 are used for the hooks of the base plate to pass through, allowing the scissor-type connecting members of the key structures 30 to connect to the hooks, thereby assembling the key structures 30 to the base plate. During the subsequent assembly process (after step S50), the positions of the structural holes 14 must correspond to the hooks of the base plate and the scissor-type connecting members of the key structures 30. Therefore, the assembly positioning hole 15 is used for positioning the fixture for assembling the key structures 30.

Additionally, in step S30, the semi-finished membrane circuit board 10*a* can be further cut to remove the circuit board positioning hole 101, thereby forming the membrane circuit board 10. For example, cut along the cutting line 102 near the outer side of the semi-finished membrane circuit board 10*a* shown in FIG. 5 to remove the circuit board positioning hole 101 that assisted in aligning the upper circuited layer 11, the spacer layer 12, and the lower circuited layer 13 in step S20, and to form the membrane circuit board 10 that can be assembled with the restoring members 20.

Step S40: Placing the membrane circuit board 10 in a restoring member assembly fixture 8, and passing the restoring member positioning hole 100 through a locating pillar 81 of the restoring member assembly fixture 8, with an inner wall of the second positioning hole 121 abutting the locating pillar 81, so that the central positions of the restoring members 20 respectively correspond to the central positions of the hollow portions 122.

The restoring member assembly fixture 8 comprises at least one locating pillar 81. The number of locating pillars 81 can correspond to the number of restoring member positioning holes 100. In this embodiment, there are three restoring member positioning holes 100, as shown in FIG. 5. Correspondingly, the restoring member assembly fixture 8 also has three locating pillars 81. FIG. 7 shows one of the locating pillars 81 as an example.

As shown in FIG. 7, in operation, the restoring members 20 can be placed in the restoring member assembly fixture 8 with their bottom surfaces facing up. Next, the membrane circuit board 10 is oriented with the upper circuited layer 11 facing the restoring members 20, and the restoring member positioning holes 100 are passed through the locating pillars 81 of the restoring member assembly fixture 8, so that the membrane circuit board 10 is placed in the restoring member assembly fixture 8. Because the minimum diameter H2 of the second positioning hole 121 is smaller than the minimum diameter H1 of the first positioning hole 111 and the minimum diameter H3 of the third positioning hole 131, the inner wall of the second positioning hole 121 will abut the locating pillar 81, so that the central positions of the restoring members 20 respectively correspond to the central positions of the hollow portions 122.

As described above, the membrane circuit board 10 in this embodiment has three restoring member positioning holes 100, which can prevent the membrane circuit board 10 from rotating relative to the locating pillars 81, achieving better positioning. In other embodiments, the number of the first positioning hole 111, the second positioning hole 121, and the third positioning hole 131 can each be one, forming one restoring member positioning hole 100. By adjusting the shapes of the restoring member positioning hole 100 and the locating pillars 81, or by providing other positioning structures, the same positioning effect can be achieved, the present disclosure is not limited thereto.

Because the minimum diameter H2 of the second positioning hole 121 is smaller than the minimum diameter H1 of the first positioning hole 111 and the minimum diameter H3 of the third positioning hole 131, when the restoring member positioning hole 100 passes through the locating pillar 81, the inner wall of the second positioning hole 121 will abut the locating pillar 81, as shown in FIG. 7. In other words, the positioning is actually done using the second positioning hole 121 of the spacer layer 12. Thus, the central positions of the restoring members 20 can respectively correspond to the central positions of the hollow portions 122. Here, this means that the central positions of the restoring members 20 and the hollow portions 122 are on the same straight line or in close positions, as shown by the dashed lines in FIG. 7.

In addition, because the first positioning hole 111, the second positioning hole 121, and the third positioning hole 131 are formed before the adhesion of the upper circuited layer 11, the spacer layer 12, and the lower circuited layer 13 (i.e., step S10 for forming the first positioning hole 111, the second positioning hole 121, and the third positioning hole 131 is done before step S20 for adhering the upper circuited layer 11, the spacer layer 12, and the lower circuited layer 13), and because positioning is done using the second positioning hole 121 of the spacer layer 12, any assembly tolerances in step S20 will not affect the alignment of the central positions of the hollow portions 122 and the restoring members 20.

The minimum diameter H2 of the second positioning hole 121 is greater than or equal to the maximum width of the locating pillar 81, allowing the second positioning hole 121 to be positioned outside the locating pillar 81. For example, if the maximum width of the locating pillar 81 is 3.4 mm, preferably, the minimum diameter H2 of the second positioning hole 121 can be 3.5 mm. In other words, the minimum diameter H2 of the second positioning hole 121 in this embodiment is slightly larger than the maximum width of the locating pillar 81, allowing the second positioning hole 121 to fit around the outside of the locating pillar 81.

Step S50: Assembling the restoring members 20 onto the membrane circuit board 10.

Next, the restoring members 20 are assembled onto the membrane circuit board 10. For example, adhesive is applied to the bottom surfaces of the restoring members 20, adhering the bottom surfaces of the restoring members 20 to the upper circuited layer 11 of the membrane circuit board 10. After adhesion, the central positions of the restoring members 20 also correspond to the central positions of the hollow portions 122, as shown in FIG. 4 and FIG. 8. As described above, this embodiment uses assembly tolerances in step S20 as an example, so the central positions of the upper conductive circuit 112 and the lower conductive circuit 132 are misaligned with the central positions of the hollow portions 122, separated by a certain distance. In step S40 of this embodiment, positioning is done using the second positioning hole 121 of the spacer layer 12 and the locating pillar 81, so that the central positions of the restoring members 20 can correspond to the central positions of the hollow portions 122. Generally, the restoring members 20 have locating pillars 21. Thus, the structure of the restoring member positioning hole 100 in this embodiment allows the locating pillars 21 to correspond to the central positions of the hollow portions 122, rather than the central positions of the upper conductive circuit 112 or the lower conductive circuit 132.

Therefore, when the keycap 31 is pressed, the locating pillars 21 of the restoring members 20 can press down the upper circuited layer 11, allowing the upper circuited layer 11 to move and deform in the direction of the hollow portions 122, causing the upper conductive circuit 112 and the lower conductive circuit 132 to contact (as shown in FIG. 4) and generate a triggering signal. Even if the locating pillars 21 of the restoring members 20 in this embodiment do not correspond to the central positions of the upper conductive circuit 112, the upper conductive circuit 112 and the lower conductive circuit 132 only need to partially contact to effectively generate a triggering signal. Moreover, because the locating pillars 21 can correspond to the central positions of the hollow portions 122, they will not be affected by the edges of the hollow portions 122, ensuring that the deformation mode of the restoring members 20 is not influenced. Therefore, the membrane circuit board 10 and the restoring members 20 assembled according to the manufacturing method shown in FIG. 2 will not affect the feel and smoothness of pressing the keycap 31 for the user, even if there are assembly tolerances.

It should be noted that the manufacturing method of the membrane keyboard 1 in this embodiment mainly relates to the manufacturing process of the membrane circuit board 10 (e.g., forming the first positioning hole 111, the second positioning hole 121, the third positioning hole 131, and the restoring member positioning hole 100) and the structural features (e.g., the minimum diameter H2 of the second positioning hole 121 being smaller than the minimum diameter H1 of the first positioning hole 111 and the minimum diameter H3 of the third positioning hole 131), and assembling the restoring members 20 in the restoring member assembly fixture 8 onto the membrane circuit board 10 (e.g., step S40). Subsequent steps for assembling the key structures 30 are common manufacturing procedures in the technical field of the present disclosure and are not elaborated here.

In continuation of the above, according to the membrane keyboard and its manufacturing method of the present disclosure, first positioning holes, second positioning holes, and third positioning holes are respectively formed on the upper circuited layer, spacer layer, and lower circuited layer of the membrane circuit board. The first positioning hole, the second positioning hole, and the third positioning hole collectively form a restoring member positioning hole. The minimum diameter of the second positioning hole is smaller than the minimum diameter of the first positioning hole, and the minimum diameter of the second positioning hole is smaller than the minimum diameter of the third positioning hole. With this special structure of the restoring member positioning hole, the central positions of the restoring members can respectively correspond to the central positions of the hollow portions regardless of any assembly tolerances, thereby preventing any adverse effects on the user's keystroke feel and smoothness.

Although the present disclosure has been explained in relation to its preferred embodiments, it is to be understood that many other possible modifications and variations can be made without departing from the spirit and scope of the disclosure as hereinafter claimed.

What is claimed is:

1. A manufacturing method of membrane keyboard, applied to assemble a plurality of restoring members in a restoring member assembly fixture to a membrane circuit board, the method comprises the following steps:

forming at least one first positioning hole on an upper circuited layer, forming at least one second positioning hole and a plurality of hollow portions on a spacer layer, and forming at least one third positioning hole on a lower circuited layer, wherein a minimum diameter of the second positioning hole is smaller than a minimum diameter of the first positioning hole, and the minimum diameter of the second positioning hole is smaller than a minimum diameter of the third positioning hole;

adhering the upper circuited layer, the spacer layer, and the lower circuited layer to form a semi-finished membrane circuit board, and the first positioning hole, the second positioning hole, and the third positioning hole collectively form a restoring member positioning hole;

placing the membrane circuit board in the restoring member assembly fixture and passing the restoring member positioning hole through a locating pillar of the restoring member assembly fixture, with an inner wall of the second positioning hole abutting the locating pillar, so that the central positions of the restoring members respectively correspond to the central positions of the hollow portions; and assembling the restoring members onto the membrane circuit board.

2. The manufacturing method of membrane keyboard according to claim 1, wherein the minimum diameter of the first positioning hole is greater than the sum of the minimum diameter of the second positioning hole and an assembly tolerance, and the minimum diameter of the third positioning hole is greater than the sum of the minimum diameter of the second positioning hole and the assembly tolerance.

3. The manufacturing method of membrane keyboard according to claim 2, wherein the assembly tolerance ranges from 0.15 mm to 3 mm.

4. The manufacturing method of membrane keyboard according to claim 1, wherein an inner diameter of the second positioning hole is greater than or equal to an outer diameter of the locating pillar.

5. The manufacturing method of membrane keyboard according to claim 1, wherein the upper circuited layer comprises a plurality of the first positioning holes, the spacer layer comprises a plurality of the second positioning holes, and the lower circuited layer comprises a plurality of the third positioning holes to form a plurality of the restoring member positioning holes.

6. The manufacturing method of membrane keyboard according to claim 1, wherein after forming the restoring member positioning hole, the manufacturing method further comprises the step of:

punching a plurality of structural holes on the semi-finished membrane circuit board to form the membrane circuit board.

7. The manufacturing method of membrane keyboard according to claim 6, wherein when the semi-finished membrane circuit board is punched to form the structural holes, at least one assembly positioning hole is simultaneously formed, and the assembly positioning hole is used for positioning the assembly of a plurality of key structures so that the structural holes respectively correspond to the key structures.

8. The manufacturing method of membrane keyboard according to claim 1, wherein the upper circuited layer, the spacer layer, and the lower circuited layer each comprise a circuit board positioning hole, and the circuit board positioning hole is used for positioning the adhesion of the upper circuited layer, the spacer layer, and the lower circuited layer.

9. The manufacturing method of membrane keyboard according to claim 8 further comprises the step of:

cutting the semi-finished membrane circuit board to remove the circuit board positioning hole.

10. A membrane keyboard comprises:

a membrane circuit board comprising:

an upper circuited layer having at least one first positioning hole;

a spacer layer having at least one second positioning hole and a plurality of hollow portions, wherein a minimum diameter of the second positioning hole is smaller than a minimum diameter of the first positioning hole; and a lower circuited layer having at least one third positioning hole, wherein the minimum diameter of the second positioning hole is smaller than a minimum diameter of the third positioning hole, and the first positioning hole, the second positioning hole, and the third positioning hole collectively form a restoring member positioning hole; and a plurality of restoring members disposed on the membrane circuit board, with the central positions of the restoring members respectively corresponding to the central positions of the hollow portions.

11. The membrane keyboard according to claim 10, wherein the restoring members are accommodated in a restoring member assembly fixture before assembly, and the restoring member positioning hole of the membrane circuit board passes through a locating pillar of the restoring member assembly fixture, with an inner wall of the second positioning hole abutting the locating pillar, so that the central positions of the restoring members respectively correspond to the central positions of the hollow portions.

12. The membrane keyboard according to claim 11, wherein the minimum diameter of the first positioning hole is greater than the sum of the minimum diameter of the second positioning hole and an assembly tolerance, and the minimum diameter of the third positioning hole is greater than the sum of the minimum diameter of the second positioning hole and the assembly tolerance.

13. The membrane keyboard according to claim 12, wherein the assembly tolerance ranges from 0.15 mm to 3 mm.

14. The membrane keyboard according to claim 11, wherein an inner diameter of the second positioning hole is greater than or equal to an outer diameter of the locating pillar.

15. The membrane keyboard according to claim 10, wherein the upper circuited layer comprises a plurality of the first positioning holes, the spacer layer comprises a plurality of the second positioning holes, and the lower circuited layer comprises a plurality of the third positioning holes to form a plurality of the restoring member positioning holes.

16. The membrane keyboard according to claim 10 further comprises:

a plurality of key structures disposed on the membrane circuit board, with the restoring members respectively contacting the key structures.

17. The membrane keyboard according to claim 16, wherein the membrane circuit board comprises a plurality of structural holes and at least one assembly positioning hole, with the structural holes respectively corresponding to the key structures, and the assembly positioning hole used for positioning the assembly of the key structures.

* * * * *